(12) United States Patent
Yu et al.

(10) Patent No.: US 11,455,525 B2
(45) Date of Patent: Sep. 27, 2022

(54) METHOD AND APPARATUS OF OPEN SET RECOGNITION AND A COMPUTER READABLE STORAGE MEDIUM

(71) Applicant: FUJITSU LIMITED, Kawasaki (JP)

(72) Inventors: Xiaoyi Yu, Beijing (CN); Jun Sun, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 952 days.

(21) Appl. No.: 16/180,400

(22) Filed: Nov. 5, 2018

(65) Prior Publication Data
US 2019/0147336 A1    May 16, 2019

(30) Foreign Application Priority Data
Nov. 10, 2017    (CN) .......................... 201711105713.4

(51) Int. Cl.
| | | |
|---|---|---|
| *G06N 3/08* | (2006.01) | |
| *G06N 3/04* | (2006.01) | |
| *G06N 5/04* | (2006.01) | |
| *G06K 9/62* | (2022.01) | |
| *G06V 30/244* | (2022.01) | |
| *G06V 30/28* | (2022.01) | |

(52) U.S. Cl.
CPC ............. *G06N 3/08* (2013.01); *G06K 9/6256* (2013.01); *G06N 3/0454* (2013.01); *G06N 5/046* (2013.01); *G06V 30/244* (2022.01); *G06V 30/287* (2022.01)

(58) Field of Classification Search
CPC ........ G06N 3/08; G06N 3/0454; G06N 5/046; G06K 9/6256
See application file for complete search history.

(56) References Cited

U.S. PATENT DOCUMENTS

| | | | |
|---|---|---|---|
| 10,210,631 B1* | 2/2019 | Cinnamon | ............ G06T 11/003 |
| 2016/0282394 A1* | 9/2016 | House | ................ G06K 9/00577 |
| 2017/0300785 A1* | 10/2017 | Merhav | .................... G06N 3/08 |
| 2018/0181593 A1* | 6/2018 | Ranzinger | ........... G06F 16/5838 |
| 2019/0034800 A1 | 1/2019 | Shiratani | |
| 2019/0122120 A1* | 4/2019 | Wu | ...................... G06N 3/0454 |

FOREIGN PATENT DOCUMENTS

| | | |
|---|---|---|
| JP | 2003-168113 | 6/2003 |
| WO | 2017/175282 | 10/2017 |

OTHER PUBLICATIONS

Ge et al., "Generative OpenMax for Multi-Class Open Set Classification", Jul. 24, 2017, arXiv:1707.07418v1, pp. 1-12. (Year: 2017).*

(Continued)

*Primary Examiner* — Ying Yu Chen
(74) *Attorney, Agent, or Firm* — Staas & Halsey LLP

(57) ABSTRACT

A method and apparatus of open set recognition, and a computer-readable storage medium are disclosed. The method comprises acquiring auxiliary data and training data of known categories for open set recognition, training a neural network alternately using the auxiliary data and the training data, until convergence; extracting a feature of data to be recognized for open set recognition, using the trained neural network; and recognizing a category of data to be recognized, based on the feature of the data to be recognized.

16 Claims, 4 Drawing Sheets

(56) References Cited

OTHER PUBLICATIONS

Yu et al., "Generative Adversarial Networks for Open Set Historical Chinese Character Recognition", Jan. 1, 2018, IS&T International Symposium on Electronic Imaging 2018 Visual Information Processing and Communication IX, pp. 174-1 to 174-5. (Year: 2018).*
Guibas et al., "Synthetic Medical Images from Dual Generative Adversarial Networks", Sep. 2017, arXiv:1709.01872v1, pp. 1-7. (Year: 2017).*
Gan et al., "Triangle Generative Adversarial Networks", Sep. 19, 2017, arXiv:1709.06548v1, pp. 1-13. (Year: 2017).*
Japanese Office Action dated Jul. 19, 2022 from Japanese Application No. 2018-209875.
Zili Yi et al., "DualGAN: Unsupervised Dual Learning for Image-to-Image Translation", 2017 IEEE International Conference on Computer Vision (ICCV), 2017, pp. 2849-2857.
Yujie Liu, et al., "Car Plate Character Recognition Using A Convolutional Neural Network With Shared Hidden Layers", 2015 Chinese Automation Congress (CAC), 2015, pp. 638-643.

\* cited by examiner

METHOD AND APPARATUS OF OPEN SET RECOGNITION AND A COMPUTER READABLE STORAGE MEDIUM

CROSS REFERENCE TO RELATED APPLICATION

This application claims the priority of Chinese Patent Application No. 201711105713.4, entitled "A METHOD AND APPARATUS OF OPEN SET RECOGNITION AND A COMPUTER-READABLE STORAGE MEDIUM", filed on Nov. 10, 2017, the entire contents of which are incorporated herein by reference.

FIELD OF THE INVENTION

The present invention relates generally to an image processing method, and particularly to a method and apparatus of open set recognition, and a computer-readable storage medium.

BACKGROUND

Ancient document Chinese character recognition is very important for ancient document digitization, ancient document sorting and culture protection. In comparison with modern Chinese character recognition, however, ancient document Chinese character recognition is a very challenging problem. Firstly, the number of ancient document Chinese characters is much larger than the number of modern Chinese characters; secondly, the structures of ancient document Chinese characters are much more complicated than the structures of modern simplified Chinese characters; thirdly, ancient document Chinese characters have font variations in more forms, that is, a certain number of ancient document Chinese characters have many variant forms; fourthly, due to use of writing brushes or wood carving and printing, writing styles are different, and finally, deteriorations of photographed or scanned images of ancient documents are more severe than those of modern documents.

In recent years, deep learning methods such as convolutional neural networks (CNNs) and the like are superior to the traditional character recognition methods in the OCR research field. The mainstream CNN-based supervised learning methods at present generally need tens of millions of training samples, which are required to be marked manually. In ancient document Chinese character recognition, it is infeasible to mark a large amount of these data at all. In our past work, we proposed a semi-supervised learning method which uses unmarked training samples to improve recognition precision; however, the working principle of this semi-supervised learning algorithm is based on an assumption of a closed world. In other words, it is assumed that the number of categories of test data is consistent with the number of categories of data used during training. Such a problem that all test categories have been known at the time of training is called closed set recognition.

In addition, in an open set recognition algorithm which recognizes ancient document Chinese characters by sequentially marking (e.g., page by page, book by book) training samples, after one model has been trained using tag data, test data during a test possibly come from categories which are not necessarily seen in the training. Such a problem that the test data comprise categories which cannot be seen during the training is called open set recognition. For example, if training samples correspond to K different categories of ancient document Chinese characters, a test image corresponding to one character in the K categories is given, and the open set recognition algorithm shall be capable of recognizing the character; and if the test image corresponds to a character in categories other than the K character categories which cannot be seen during the training, the open set recognition algorithm shall be capable of neglecting or denying test samples. The denied test samples can be manually marked (as new categories) and again placed into a training set to train a new model.

For the open set recognition, incomplete understanding to a problem space to be recognized exists during the training, and a submission of test samples of an unknown category to a recognition algorithm possibly occurs during the test. The target of the open set recognition algorithm is to learn a prediction model, to classify data from known categories into correct categories and deny data from unknown categories. In the prior art, some methods for open set recognition have been proposed. For example, by introducing the concept of open space risk, open set recognition is performed using linear SVM based on one pair of combined machine formulae; open set recognition is performed based on a category reconstruction error algorithm represented by generalized sparsity, which subjects a tail of an error distribution to modeling using statistical Extreme Value Theory (EVT); open set recognition is performed by introducing Compactness Probability (CAP); and, open set recognition is performed based on a developed Weibull calibration SVM (W-SVM) algorithm, which essentially combines the statistical EVT with the binary SVM for open set recognition.

We found that, most of the open set recognition algorithms in the prior art consider features extracted from a training data set as being capable of effectively representing data of different categories (including known categories and unknown categories). In many cases, however, this assumption is untenable or partially tenable; for example, a CNN-based end-to-end method can only learn features of known categories. If these features cannot represent data of unknown categories, it is impossible to find new unknown data utilizing these features. Thus, features having been learned are the key of detection of unknown categories.

SUMMARY

A brief summary of the present invention is given below to provide a basic understanding of some aspects of the present invention. It should be understood that the summary is not exhaustive; it does not intend to define a key or important part of the present invention, nor does it intend to limit the scope of the present invention. The object of the summary is only to briefly present some concepts, which serves as a preamble of the detailed description that follows.

In view of the above defects of the prior art, one aspect of the present invention is to provide a feature learning method using an auxiliary data set so as to enhance a feature representation, thereby learning a feature for open set recognition.

According to another aspect, there is provided a method of open set recognition, comprising: acquiring auxiliary data and training data of known categories for open set recognition; training a neural network alternately using the auxiliary data and the training data, until convergence; extracting a feature of data to be recognized for open set recognition, using the trained neural network; and recognizing a category of data to be recognized, based on the feature of the data to be recognized.

According to another aspect, there is provided an apparatus of open set recognition, comprising: acquiring means for acquiring auxiliary data and training data of known categories for open set recognition; training means for training a neural network alternately using the auxiliary data and the training data, until convergence; extracting means for extracting a feature of data to be recognized for open set recognition, using the trained neural network; and recognizing means for recognizing a category of the data to be recognized, based on the feature of the data to be recognized.

According to still another aspect, there is further provided a computer-readable storage medium storing therein a program that can be run by a processor to perform the operations of: acquiring auxiliary data and training data of known categories for open set recognition; training a convolution neural network alternately using the auxiliary data and the training data, until convergence; extracting a feature of data to be recognized for open set recognition, using the trained neural network; and recognizing a category of the data to be recognized, based on the feature of the data to be recognized.

According to yet another aspect, there is further provided a program comprising machine-executable instructions that, when executed on an information processing apparatus, cause the information processing apparatus to implement the foregoing method according to the present invention.

The foregoing method and apparatus can extract an enhanced feature representation of data by performing alternate leaning on a feature of auxiliary data and a feature of training data.

These and other advantages will become more apparent from the following detailed description of preferred embodiments combined with the drawings.

BRIEF DESCRIPTION OF THE DRAWINGS

Other features and advantages will be understood more easily by reading respective embodiments with reference to the drawings. The drawings described herein are only for the purpose of schematically illustrating embodiments of the present invention, instead of all possible embodiments, and are not intended to limit the scope of the present invention. In the drawings.

DETAILED DESCRIPTION

Figure 1:
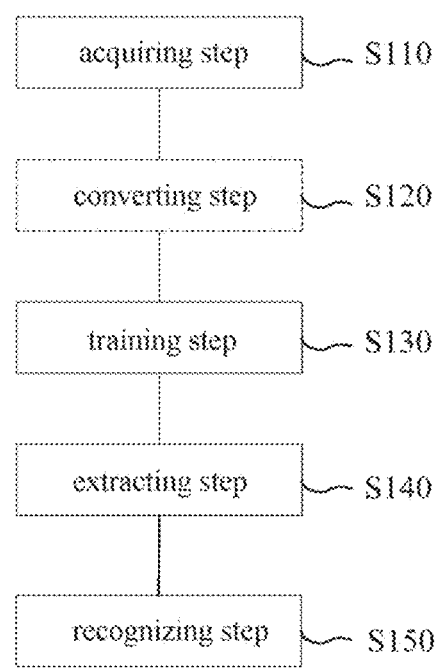
FIG. 1 shows a flow chart of a method of open set recognition according to an embodiment.

Exemplary embodiments will be described combined with the drawings hereinafter. For the sake of clarity and conciseness, the description does not describe all features of actual embodiments. However, it should be understood that in developing any such actual embodiment, many decisions specific to the embodiments must be made, so as to achieve specific objects of a developer; for example, those limitation conditions related to systems and services are met, and these limitation conditions possibly will vary as embodiments are different. In addition, it should be appreciated that although developing tasks are possibly complicated and time-consuming, such developing tasks are only routine tasks for those skilled in the art benefiting from the contents of the present disclosure.

It should also be noted herein that, to avoid the present invention from being obscured due to unnecessary details, only those device structures and/or processing steps closely related to the solution according to the present invention are shown in the drawings, while omitting other details not closely related to the present invention.

Most of the open set recognition methods in the prior art are based on the following assumption: features extracted from a training data set are capable of effectively representing data of different categories (including known categories and unknown categories). Actually, for a general system, in particular for an end-to-end neural network, these effective features do not always exist. In view of this, the present application provides a new technique for extracting a feature of data for open set recognition, the feature being capable of effectively representing a category to which the data belong.

A method and apparatus according to embodiments will be described in detail by taking detection of ancient document Chinese characters of an unknown category as an application example below.

FIG. 1 shows a flow chart of a method of open set recognition according to an embodiment. As shown in FIG. 1, a method 100 of open set recognition comprises step S110, step S130, step S140 and step S150. In step S110, auxiliary data and training data of known categories for open set recognition are acquired. In step S130, a neural network is trained alternately using the auxiliary data and the training data, until convergence. In step S140, a feature of data to be recognized for open set recognition is extracted using the trained neural network. In step S150, a category of the data to be recognized is recognized based on the feature of the data to be recognized. In addition, preferably, the method 100 of open set recognition further comprises step S120, in which the auxiliary data are converted based on the training data, such that the converted auxiliary data are approximate to the training data.

In step S110, in theory, any data set can be used as an auxiliary data set to perform feature learning. In actual applications, however, if an auxiliary data set is completely different from a training data set, a learned feature is possibly not related to the problem to be solved by us, such that the learned feature is useless for detection of unknown categories. Thus, it is necessary to select an appropriate auxiliary data set, for example to select an auxiliary data set in the same field as the training data set. Preferably, an auxiliary data set similar to the training data set is selected.

Figure 2:
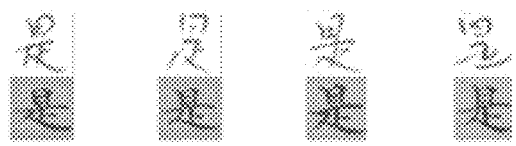
FIG. 2 shows examples of ancient document Chinese characters (second line) and CASIA handwritten data (first line).

In the application example of detecting ancient document Chinese characters of an unknown category, the training data set is an ancient document Chinese character data set of a known category, and the auxiliary data set may be selected from the existing various Chinese character sets, such as CASIA handwritten data set. In the description below, the description is made by taking the CASIA handwritten data set as the auxiliary data set. FIG. 2 shows examples of ancient document Chinese characters (second line) and CASIA handwritten data (first line).

The CASIA handwritten data are approximate to but have a completely different writing style from the ancient document Chinese character data. Preferably, it is desired that the CASIA handwritten data are approximate to the ancient document Chinese character data as far as possible, or in other words, it is desired that the auxiliary data are approximate to the training data as far as possible. Accordingly, in step S120, the auxiliary data are preferably converted to ensure that the converted auxiliary data are approximate enough to the training data, and preferably to ensure that the converted auxiliary data are approximate to the training data in terms of probability distribution.

The operation of converting the auxiliary data can be implemented utilizing the existing image processing and computer vision technology (e.g. image segmentation and style conversion methods). In the present implementation, we adopt the existing dual-generative adversarial networks (dual-GAN) mechanism to convert the CASIA handwritten data as the auxiliary data such that they are approximate to the ancient document Chinese character data. The dual-GAN mechanism is capable of training an image converter utilizing two groups of unmarked images of two sets, thereby making it unnecessary to perform onerous manual marking on data, so as to reduce costs. The operation of the dual-GAN mechanism has been well-known to those skilled in the art, and the operation of converting the auxiliary data set utilizing the dual-GAN mechanism will not be described in detail herein.

In step S130, those skilled in the art can select to use an appropriate existing neural network, such as a convolutional neural network, a full-connected neural network, a recurrent neural network or recursive neural network and the like, according to actual requirements. In the present application example, a convolutional neural network is used to extract a feature.

Figure 3:
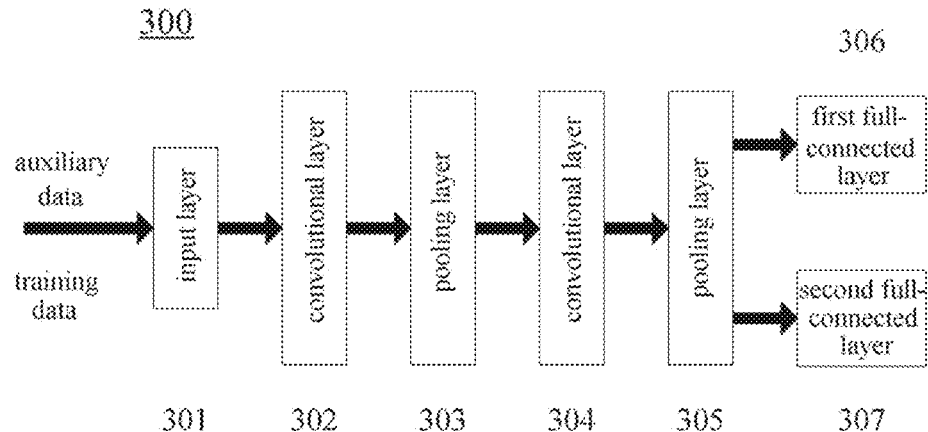
FIG. 3 shows a schematic view of an exemplary structure of a convolutional neural network used in an application example.

FIG. 3 shows a schematic view of an exemplary structure of the convolutional neural network used in the application example of the present invention. As shown in FIG. 3, a convolutional neural network 300 comprises: an input layer 301 for receiving auxiliary data (which are CASIA handwritten data in the present application example) or training data (which are ancient document Chinese character data in the present application example); a first convolutional layer 302; a first pooling layer 303; a second convolutional layer 304; a second pooling layer 305; and an output layer comprising a first full-connected layer 306 and a second full-connected layer 307. However, the structure of the convolutional neural network is not limited hereto, and those skilled in the art can design different convolutional neural networks, for example can use more or less convolutional layers, pooling layers or full-connected layers, according to actual applications. In addition, those skilled in the art can extract a feature of data to be recognized, from an output layer, a specific pooling layer or a specific convolutional layer, according to actual requirements. Preferably, the feature is extracted from a last pooling layer (i.e., the second pooling layer 305 of the exemplary convolutional neural network 300) of the convolutional neural network.

The process of training the convolutional neural network in FIG. 3 in step S130 (of FIG. 1) will be described in detail with reference to FIG. 4 below.

Figure 4:
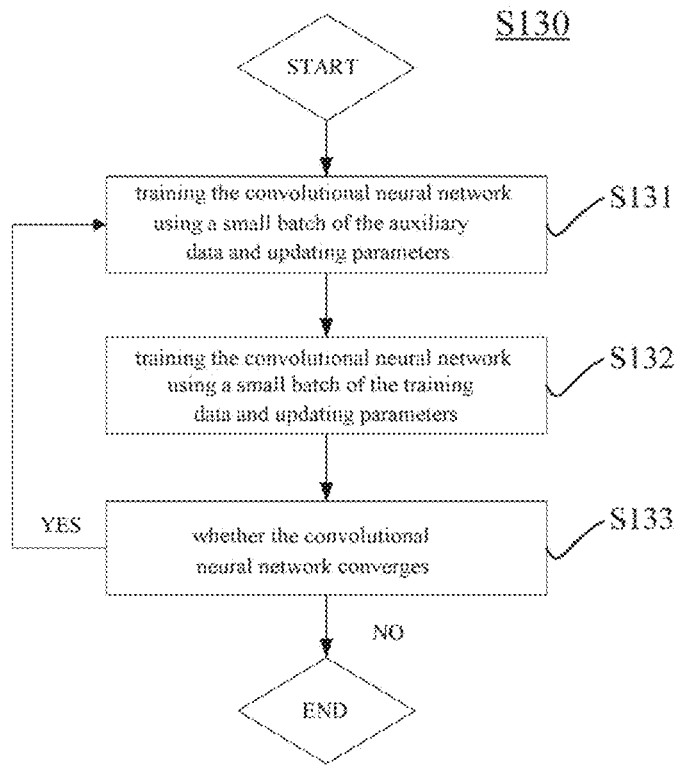
FIG. 4 shows a flow chart of processing of training a convolution neural network according to an embodiment.

FIG. 4 shows a flow chart of processing of training a convolution neural network according to an embodiment. As shown in FIG. 4, the training processing S130 comprises step S131, step S132 and step S133. In step S131, a predetermined amount (a small batch) of data are taken out of the CASIA handwritten data set as the auxiliary data set or out of the converted CASIA handwritten data set and are inputted to the convolutional neural network, a loss function of the convolutional neural network is calculated taking an output of the first full-connected layer 306 as an output of the convolutional neural network, and weight values in the convolutional neural network other than weight values of the second full-connected layer 307 are updated based on the calculated loss function. In step S132, a predetermined amount (a small batch) of data are taken out of the ancient document Chinese character data set as the training data set and are inputted to the convolutional neural network, a loss function of the convolutional neural network is calculated taking an output of the second full-connected layer 307 as an output of the convolutional neural network, and weight values in the convolutional neural network other than weight values of the first full-connected layer 306 are updated based on the calculated loss function. In step S133, it is judged whether the convolutional neural network converges. If the convolutional neural network converges, the operation ends. If the convolutional neural network does not converge, the operation returns to step S131 to be continued, until the convolutional neural network converges.

In the training method, the convolutional neural network is trained by alternately inputting the auxiliary data or the converted auxiliary data and the training data, such that the convolutional neural network can remember a learning task having been processed.

After training the convolutional neural network through the above operations, in step S140 next, a feature of data to be recognized for open set recognition can be extracted using the trained convolutional neural network, and subsequently in step S150, the data to be recognized are recognized based on the extracted feature of the data to be recognized.

The specific operation process of the recognizing step S150 of FIG. 1 will be described with reference to FIG. 5 below.

Figure 5:
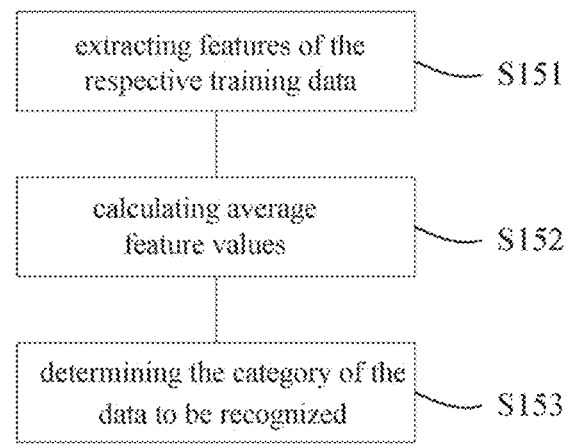
FIG. 5 shows a flow chart of exemplary processing of recognizing data to be recognized, based on a feature of the data to be recognized, according to an embodiment.

FIG. 5 shows a flow chart of exemplary processing S150 of recognizing data to be recognized, based on a feature of the data to be recognized, according to an embodiment. Herein, it is assumed that the training data are of k (k is an integer greater than or equal to 1) categories and the respective training data belong to corresponding category of the k categories. As shown in FIG. 5, the exemplary processing S150 comprises steps S151 through S153. In step S151, features of the respective training data are extracted using the trained convolutional neural network. In step S152, an average value of features of all training data contained in each category is calculated to obtain average feature values of respective categories. In step S153, the category of the data to be recognized are determined based on distances between the extracted feature of the data to be recognized and the average feature values of the respective categories. Specifically, determining the category of the data to be recognized comprises: calculating distances between the extracted feature of the data to be recognized and the average feature values of the respective categories; finding a minimum distance among the calculated distances; and comparing the minimum distance with a predetermined threshold, classifying the data to be recognized into an unknown category, if the minimum distance is greater than the predetermined threshold; classifying the data to be recognized into a category related to the minimum distance, if the minimum distance is less than the predetermined threshold.

The measurement of the distance mentioned herein may use Euclidean distance measurement or cosine distance measurement, and the like.

The processing of recognizing the data to be recognized based on the feature of the data to be recognized is not limited to the foregoing example. Those skilled in the art can also adopt other existing recognition processing, for example recognition processing utilizing the concept of sparsity aggregation index and recognition processing utilizing statistical extreme value theory and the like, according to actual applications.

The method of open set recognition according to the embodiment has been described above with reference to FIG. 1 through FIG. 5. An apparatus of open set recognition according to an embodiment will be described with reference to FIG. 6 through FIG. 7 below.

Figure 6:
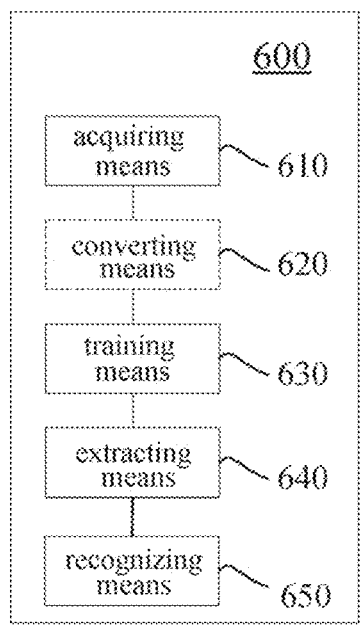
FIG. 6 shows a structural block diagram of an apparatus of open set recognition according to an embodiment.

FIG. 6 shows a structural block diagram of an apparatus of open set recognition according to an embodiment of the present invention. As shown in FIG. 6, an apparatus 600 of open set recognition comprises: acquiring means 610 for acquiring auxiliary data and training data of known categories for open set recognition; training means 630 for training a neural network alternately using the auxiliary data and the training data, until convergence; extracting means 640 for extracting a feature of data to be recognized for open set recognition, using the trained neural network; and recognizing means 650 for recognizing a category of the data to be recognized, based on the feature of the data to be recognized. Preferably, the apparatus 600 further comprises converting means 620 configured to convert the auxiliary data based on the training data, such that the converted auxiliary data are approximate to the training data.

As to the trained neural network, those skilled in the art can select to use an appropriate existing neural network, such as a convolutional neural network, a full-connected neural network, a recurrent neural network or recursive neural network and the like, according to actual requirements. In an application example of detecting ancient document Chinese characters of an unknown category, a convolutional neural network is used to extract a feature. An output layer of the convolutional neural network comprises a first full-connected layer and a second full-connected layer which are parallel. In this case, the training means 630 is further configured to perform the following operations iteratively, until the convolutional neural network converges: taking a predetermined amount (a small batch) of data out of the CASIA handwritten data set as the auxiliary data set or out of the converted CASIA handwritten data set and inputting the predetermined amount of data to the convolutional neural network, calculating a loss function of the convolutional neural network taking an output of the first full-connected layer 306 as an output of the convolutional neural network, and updating weight values in the convolutional neural network other than weight values of the second full-connected layer 307 based on the calculated loss function; and taking a predetermined amount (a small batch) of data out of the ancient document Chinese character data set as the training data set and inputting the predetermined amount of data to the convolutional neural network, calculating a loss function of the convolutional neural network taking an output of the second full-connected layer 307 as an output of the convolutional neural network, and updating weight values in the convolutional neural network other than weight values of the first full-connected layer 306 based on the calculated loss function.

Figure 7:
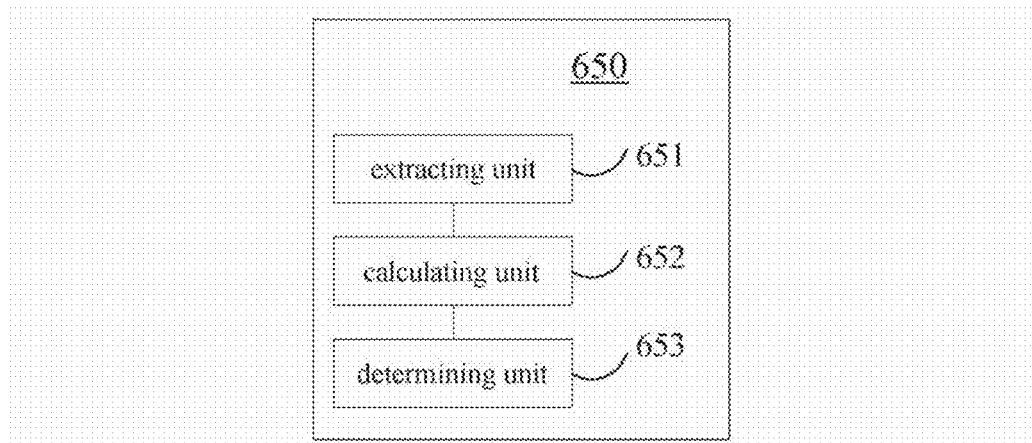
FIG. 7 shows a structural block diagram of recognizing means in an apparatus of open set recognition according to an embodiment.

FIG. 7 shows a structural block diagram of an exemplary configuration of recognizing means according to an embodiment of the present invention. Herein, it is assumed that the training data are of k (k is an integer greater than or equal to 1) categories and the respective training data belong to corresponding category of the k categories. As shown in FIG. 7, exemplary recognizing means 650 comprises: an extracting unit 651 configured to extract features of the respective training data using the trained convolutional neural network; a calculating unit 652 configured to calculate an average value of features of all training data contained in each category, to obtain average feature values of respective categories; and a determining unit 653 configured to determine the category of the data to be recognized, based on distances between the extracted feature of the data to be recognized and the average feature values of the respective categories.

Specifically, the determining unit 653 is further configured to: calculate distances between the extracted feature of the data to be recognized and the average feature values of the respective categories; find a minimum distance among the calculated distances; and compare the minimum distance with a predetermined threshold, classify the data to be recognized into an unknown category, if the minimum distance is greater than the predetermined threshold; classify the data to be recognized into a category related to the minimum distance, if the minimum distance is less than the predetermined threshold.

As stated above, the foregoing recognition method only serves as an example. Those skilled in the art can adopt other existing methods for recognizing data to be recognized based on a feature of the data to be recognized, according to actual requirements.

The method and apparatus of open set recognition according to the embodiments have been described above by taking detection of ancient document Chinese characters of an unknown category as an application example. However, the embodiments are not limited to the foregoing application example. For example, the embodiments are also applicable in abnormality detection or fault detection in the industrial field. In one application scenario, it is possible to train a neural network (such as a convolutional neural network) using appropriate auxiliary data, and normal operation data of a system as training data, and then to extract a feature using the trained neural network, and to recognize an abnormal operation condition of the system, such as an electric power system fault, a motor fault and a chemical process fault and the like, based on the extracted feature. In another application scenario, it is possible to train a neural network using appropriate auxiliary data, and existing abnormal condition data and normal operation data of a system as training data, and then to extract a feature using the trained neural network, and to recognize an unknown abnormal condition of the current system based on the extracted feature.

In addition, aspects of the present invention are also applicable in lesion detection in the medical field. In one application scenario, it is possible to train a neural network using appropriate auxiliary data, and health data (such as CT data, B-ultrasound data and X-ray images and the like) as training data, and then to extract a feature using the trained neural network, and to recognize a lesion based on the extracted feature. In another application scenario, it is possible to train a neural network using appropriate auxiliary data, and existing lesion data and health data as training data, and then to extract a feature using the trained neural network, and to recognize an unknown lesion based on the extracted feature.

Furthermore, aspects of the present invention are also applicable in abnormality or fraud detection in the e-commerce field. In this case, it is possible to train a neural network using approximate auxiliary data, and normal e-commerce data as training data, and then to extract a feature using the trained neural network, and to recognize an abnormal transaction behavior and/or fraud behavior based on the extracted feature.

In addition, aspects of the present invention are also applicable in credit evaluation in the bank or telecommunication field. In this case, it is possible to train a neural network using appropriate auxiliary data samples, and normal customer behaviors as training data, and then to extract a feature using the trained neural network, and to recognize a non-normal customer based on the extracted feature.

Although the foregoing application examples have been given for the sake of description, the application field and the application scenario of the present invention are not limited to the foregoing examples, and those skilled in the art can apply the method and apparatus according to the present invention to other different fields and scenarios according to actual requirements.

The method and apparatus according to the present invention perform alternate learning on a feature of auxiliary data and a feature of open set data, thereby making it possible to extract an enhanced feature representation of the open set data.

Figure 8:
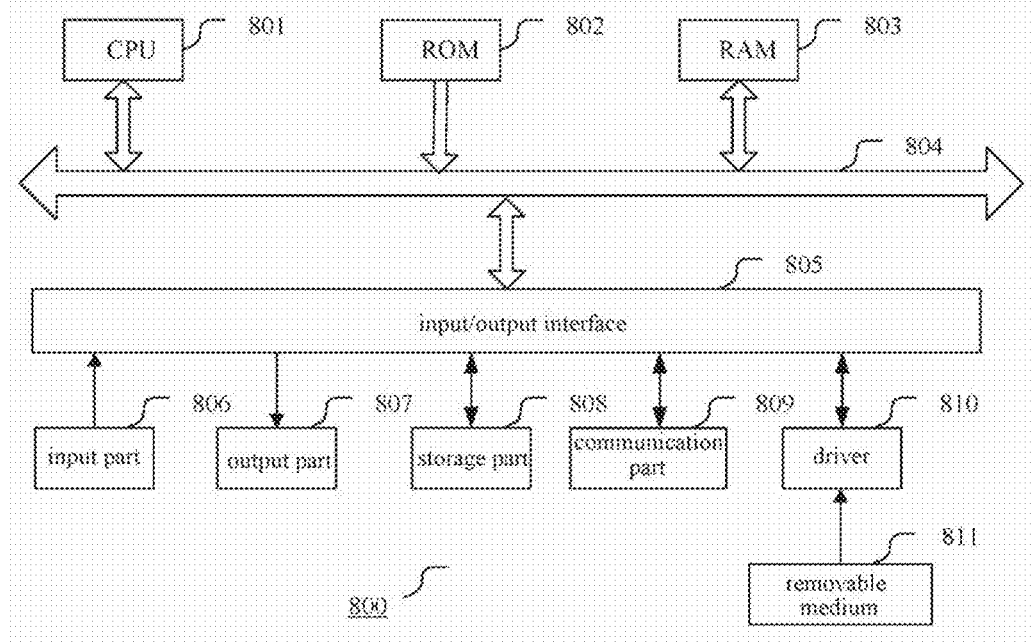
FIG. 8 shows a schematic block diagram of a computer for implementing the method and apparatus according to the embodiments.

In addition, it should also be noted that, the respective constituent components in the foregoing system may be configured through software, firmware, hardware or a combination thereof. The specific means or manners that can be used for the configuration are well-known to those skilled in the art, and will not be repeatedly described herein. In a case where the configuration is implemented through software or firmware, programs constituting the software are installed from a storage medium or a network to a computer having a dedicated hardware structure (e.g. the general-purpose computer 800 as shown in FIG. 8). The computer, when installed with various programs, is capable of implementing various functions and the like.

FIG. 8 shows a schematic block diagram of a computer that can be used for implementing the method and system according to the embodiments of the present invention.

In FIG. 8, a central processing unit (CPU) 801 performs various processing according to programs stored in a read-only memory (ROM) 802 or programs loaded from a storage part 808 to a random access memory (RAM) 803. In the RAM 803, data needed when the CPU 801 performs various processing and the like is also stored, as needed. The CPU 801, the ROM 802 and the RAM 803 are connected to each other via a bus 804. An input/output interface 805 is also connected to the bus 804.

The following components are connected to the input/output interface 805: an input part 806 (including keyboard, mouse and the like), an output part 807 (including display such as cathode ray tube (CRT), liquid crystal display (LCD) and the like, and loudspeaker and the like), a storage part 808 (including hard disc and the like), and a communication part 809 (including network interface card such as LAN card, modem and the like). The communication part 809 performs communication processing via a network such as the Internet. A driver 810 may also be connected to the input/output interface 805, as needed. As needed, a removable medium 811, such as a magnetic disc, an optical disc, a magnetic optical disc, a semiconductor memory and the like, may be installed in the driver 810, such that a computer program read therefrom is installed in the memory part 808 as needed.

In the case where the foregoing series of processing is implemented through software, programs constituting the software are installed from a network such as the Internet or a memory medium such as the removable medium 811.

It should be understood by those skilled in the art that, such a memory medium is not limited to the removable mediums 811 as shown in FIG. 8 in which programs are stored and which are distributed separately from the apparatus to provide the programs to users. Examples of the removable medium 811 include a magnetic disc (including floppy disc (registered trademark)), a compact disc (including compact disc read-only memory (CD-ROM) and digital video disk (DVD)), a magnetic optical disc (including mini disc (MD) (registered trademark)), and a semiconductor memory. Alternatively, the memory mediums may be hard discs included in the ROM 802 and the memory part 808 and the like, in which programs are stored and which are distributed together with the apparatus containing them to users.

The present invention further proposes a program product having machine-readable instruction codes stored thereon. The instruction codes, when read and executed by a machine, can implement the foregoing method according to the embodiment of the present invention.

Accordingly, a storage medium for carrying the foregoing program product having computer-readable instruction codes stored thereon is also included in the scope of the present invention. The storage medium includes, but is not limited to, a soft disc, an optical disc, a magnetic optical disc, a memory card, a memory stick and the like.

It should be noted that, the method of the present invention is not limited to be implemented according to the time order described in the description, but may also be implemented sequentially, in parallel or independently according to another time order. Thus, the implementation order of the method described in the description is not to be construed as limiting the technical scope of the present invention.

The foregoing description of the various embodiments of the present invention aims to better understand the present invention, and it is only exemplary but is not intended to limit the present invention. It should be noted that in the foregoing description, features described and/or shown for one embodiment may be used in one or more other embodiments in an identical or similar manner, be combined with features in other embodiments, or substitute features in other embodiments. Those skilled in the art can understand that without departing from the inventive concept of the present invention, various alterations and modifications carried out for the embodiments described above fall within the scope of the present invention.

According to an aspect of the present invention, a method of open set recognition comprises: acquiring auxiliary data and training data of known categories for open set recognition; training a neural network alternately using the auxiliary data and the training data, until convergence; extracting a feature of data to be recognized for open set recognition, using the trained neural network; and recognizing a category of data to be recognized, based on the feature of the data to be recognized. The method further comprises: converting the auxiliary data based on the training data, such that the converted auxiliary data are approximate to the training data. The neural network is a convolutional neural network. Training the convolutional neural network comprises: performing the following operations iteratively, until the convolutional neural network converges, wherein an output layer of the convolutional neural network comprises a first full-connected layer and a second full-connected layer which are parallel: taking a predetermined amount of data out of the auxiliary data and inputting the predetermined amount of data to the convolutional neural network, calculating a loss function of the convolutional neural network taking an output of the first full-connected layer as an output of the convolutional neural network, and updating weight values in the convolutional neural network other than weight values of the second full-connected layer based on the calculated loss function; and taking a predetermined amount of data out of the training data and inputting the predetermined amount of data to the convolutional neural network, calculating a loss function of the convolutional neural network taking an output of the second full-connected layer as an output of the convolutional neural network, and updating weight values in the convolutional neural network other than weight values of the first full-connected layer based on the calculated loss function. The convolutional neural network comprises a first convolutional layer, a second convolutional layer, a first pooling layer interposed between the first convolutional layer and the second convolutional layer, a second pooling layer downstream of the second convolutional layer, and the first full-connected layer and the second full-connected layer which are parallel that are downstream of the second pooling layer, wherein features are extracted from the second pooling layer. The auxiliary data are converted using Dual-GAN. The training data are of k categories and the respective training data belong to corresponding category of the k categories, where k is an integer greater than or equal to 1, wherein recognizing the category of the data to be recognized comprises: extracting features of the respective training data using the trained convolutional neural network; calculating an average value of features of all training data contained in each category, to obtain average feature values of respective categories; determining the category of the data to be recognized, based on distances between the feature of the data to be recognized and the average feature values of the respective categories. Determining the category of the data to be recognized comprises: calculating distances between the feature of the data to be recognized and the average feature values of the respective categories; finding a minimum distance among the calculated distances; and comparing the minimum distance with a predetermined threshold, classifying the data to be recognized into an unknown category, if the minimum distance is greater than the predetermined threshold; classifying the data to be recognized into a category related to the minimum distance, if the minimum distance is less than the predetermined threshold. The auxiliary data are converted based on the training data, such that the converted auxiliary data are approximate to the training data in terms of probability distribution. Auxiliary data similar to the training data are acquired.

According to another aspect of the present invention, an apparatus of open set recognition comprises: acquiring means for acquiring auxiliary data and training data of known categories for open set recognition; training means for training a neural network alternately using the auxiliary data and the training data, until convergence; extracting means for extracting a feature of data to be recognized for open set recognition, using the trained neural network; and recognizing means for recognizing a category of the data to be recognized, based on the feature of the data to be recognized. The apparatus further comprises: converting means for converting the auxiliary data based on the training data, such that the converted auxiliary data are approximate to the training data. The neural network is a convolutional neural network. The training means is further configured to perform the following operations iteratively, until the convolutional neural network converges, wherein an output layer of the convolutional neural network comprises a first full-connected layer and a second full-connected layer which are parallel: taking a predetermined amount of data out of the auxiliary data and inputting the predetermined amount of data to the convolutional neural network, calculating a loss function of the convolutional neural network taking an output of the first full-connected layer as an output of the convolutional neural network, and updating weight values in the convolutional neural network other than weight values of the second full-connected layer based on the calculated loss function; and taking a predetermined amount of data out of the training data and inputting the predetermined amount of data to the convolutional neural network, calculating a loss function of the convolutional neural network taking an output of the second full-connected layer as an output of the convolutional neural network, and updating weight values in the convolutional neural network other than weight values of the first full-connected layer based on the calculated loss function. The convolutional neural network comprises a first convolutional layer, a second convolutional layer, a first pooling layer interposed between the first convolutional layer and the second convolutional layer, a second pooling layer downstream of the second convolutional layer, and the first full-connected layer and the second full-connected layer which are parallel that are downstream of the second pooling layer, wherein features are extracted from the second pooling layer. The converting means converts the auxiliary data using Dual-GAN. The training data are of k categories and the respective training data belong to corresponding category of the k categories, where k is an integer greater than or equal to 1, wherein the recognizing means further comprises: an extracting unit for extracting features of the respective training data using the trained convolutional neural network; a calculating unit for calculating an average value of features of all training data contained in each category, to obtain average feature values of respective categories; a determining unit for determining the category of the data to be recognized, based on distances between the feature of the data to be recognized and the average feature values of the respective categories. The determining unit is further configured to: calculate distances between the feature of the data to be recognized and the average feature values of the respective categories; find a minimum distance among the calculated distances; and compare the minimum distance with a predetermined threshold, classify the data to be recognized into an unknown category, if the minimum distance is greater than the predetermined threshold; classify the data to be recognized into a category related to the minimum distance, if the minimum distance is less than the predetermined threshold. The converting means converts the auxiliary data based on the training data, such that the converted auxiliary data are approximate to the training data in terms of probability distribution.

According to still another aspect of the present invention, a computer-readable storage medium stores therein a program that can be run by a processor to perform the operations of: acquiring auxiliary data and training data of known categories for open set recognition; training a neural network alternately using the auxiliary data and the training data, until convergence; extracting a feature of data to be recognized for open set recognition, using the trained neural network; and recognizing a category of the data to be recognized, based on the feature of the data to be recognized.

The invention claimed is:

1. A method of open set recognition, comprising:
acquiring auxiliary data and training data of known categories for open set recognition;
training a convolutional neural network alternately using the auxiliary data and the training data, until convergence occurs;
extracting a feature of data to be recognized for the open set recognition, using the trained convolutional neural network; and
recognizing a category of the data to be recognized, based on the feature of the data to be recognized,
wherein the training the convolutional neural network comprises:
performing the following operations iteratively, until the convolutional neural network converges, wherein an output layer of the convolutional neural network comprises a first full-connected layer and a second full-connected layer which are parallel:
taking a predetermined amount of data out of the auxiliary data and inputting the predetermined amount of data to the convolutional neural network, calculating a loss function of the convolutional neural network taking an output of the first full-connected layer as an output of the convolutional neural network, and updating weight values in the convolutional neural network other than weight values of the second full-connected layer based on the calculated loss function; and
taking a predetermined amount of data out of the training data and inputting the predetermined amount of data to the convolutional neural network, calculating a loss function of the convolutional neural network taking an output of the second full-connected layer as an output of the convolutional neural network, and updating weight values in the convolutional neural network other than weight values of the first full-connected layer based on the calculated loss function.

2. The method according to claim 1, further comprising:
converting the auxiliary data based on the training data, such that the converted auxiliary data correspond to the training data.

3. The method according to claim 1, wherein the convolutional neural network comprises a first convolutional layer, a second convolutional layer, a first pooling layer interposed between the first convolutional layer and the second convolutional layer, a second pooling layer downstream of the second convolutional layer, and the first full-connected layer and the second full-connected layer which are parallel that are downstream of the second pooling layer, wherein features are extracted from the second pooling layer.

4. The method according to claim 2, wherein the auxiliary data are converted using Dual-Generative Adversarial Networks (Dual-GAN).

5. The method according to claim 1, wherein the training data includes k categories and the respective training data belong to a corresponding category of the k categories, where k is an integer greater than or equal to 1, wherein the recognizing the category of the data to be recognized comprises:
extracting features of the respective training data using a trained convolutional neural network;
calculating an average value of features of all training data contained in each category, to obtain average feature values of respective categories; and
determining the category of the data to be recognized, based on distances between the feature of the data to be recognized and the average feature values of the respective categories.

6. The method according to claim 5, wherein the determining the category of the data to be recognized comprises:
calculating distances between the feature of the data to be recognized and the average feature values of the respective categories;
finding a minimum distance among the calculated distances; and
comparing the minimum distance with a predetermined threshold, classifying the data to be recognized into an unknown category, if the minimum distance is greater than the predetermined threshold; classifying the data to be recognized into a category related to the minimum distance, if the minimum distance is less than the predetermined threshold.

7. The method according to claim 2, wherein the auxiliary data are converted based on the training data, such that the converted auxiliary data correspond to the training data in terms of probability distribution.

8. The method according to claim 1, wherein auxiliary data corresponding to the training data are acquired.

9. An apparatus of open set recognition, comprising:
a memory; and
a processor coupled to the memory and configured to:
acquire auxiliary data and training data of known categories for open set recognition;
train a convolutional neural network alternately using the auxiliary data and the training data, until convergence occurs;
extract a feature of data to be recognized for the open set recognition, using the trained convolutional neural network; and
recognize a category of the data to be recognized, based on the feature of the data to be recognized,
wherein the processor is further configured to perform the following operations iteratively, until the convolutional neural network converges, wherein an output layer of the convolutional neural network comprises a first full-connected layer and a second full-connected layer which are parallel:
taking a predetermined amount of data out of the auxiliary data and inputting the predetermined amount of data to the convolutional neural network, calculating a loss function of the convolutional neural network taking an output of the first full-connected layer as an output of the convolutional neural network, and updating weight values in the convolutional neural network other than weight values of the second full-connected layer based on the calculated loss function; and
taking a predetermined amount of data out of the training data and inputting the predetermined amount of data to the convolutional neural network, calculating a loss function of the convolutional neural network taking an output of the second full-connected layer as an output of the convolutional neural network, and updating weight values in the convolutional neural network other than weight values of the first full-connected layer based on the calculated loss function.

10. The apparatus according to claim 9, wherein the processor is further configured to:

convert the auxiliary data based on the training data, such that the converted auxiliary data correspond to the training data.

11. The apparatus according to claim 9, wherein the convolutional neural network comprises a first convolutional layer, a second convolutional layer, a first pooling layer interposed between the first convolutional layer and the second convolutional layer, a second pooling layer downstream of the second convolutional layer, and the first full-connected layer and the second full-connected layer which are parallel that are downstream of the second pooling layer, wherein features are extracted from the second pooling layer.

12. The apparatus according to claim 10, wherein the processor converts the auxiliary data using Dual-Generative Adversarial Networks (Dual-GAN).

13. The apparatus according to claim 9, wherein the training data includes k categories and the respective training data belong to a corresponding category of the k categories, where k is an integer greater than or equal to 1, wherein the processor is further configured to:
 extract features of the respective training data using a trained convolutional neural network;
 calculate an average value of features of all training data contained in each category, to obtain average feature values of respective categories; and
 determine the category of the data to be recognized, based on distances between the feature of the data to be recognized and the average feature values of the respective categories.

14. The apparatus according to claim 13, wherein the processor is further configured to:
 calculate distances between the feature of the data to be recognized and the average feature values of the respective categories;
 find a minimum distance among the calculated distances; and
 compare the minimum distance with a predetermined threshold, classify the data to be recognized into an unknown category, if the minimum distance is greater than the predetermined threshold; classify the data to be recognized into a category related to the minimum distance, if the minimum distance is less than the predetermined threshold.

15. The apparatus according to claim 10, wherein the processor converts the auxiliary data based on the training data, such that the converted auxiliary data correspond to the training data in terms of probability distribution.

16. A non-transitory computer-readable storage medium storing therein a program that can be run by a processor to perform the operations of:
 acquiring auxiliary data and training data of known categories for open set recognition;
 training a convolutional neural network alternately using the auxiliary data and the training data, until convergence occurs;
 extracting a feature of data to be recognized for the open set recognition, using the trained convolutional neural network; and
 recognizing a category of the data to be recognized, based on the feature of the data to be recognized,
 wherein the processor is further configured to perform the following operations iteratively, until the convolutional neural network converges, wherein an output layer of the convolutional neural network comprises a first full-connected layer and a second full-connected layer which are parallel:
 taking a predetermined amount of data out of the auxiliary data and inputting the predetermined amount of data to the convolutional neural network, calculating a loss function of the convolutional neural network taking an output of the first full-connected layer as an output of the convolutional neural network, and updating weight values in the convolutional neural network other than weight values of the second full-connected layer based on the calculated loss function; and
 taking a predetermined amount of data out of the training data and inputting the predetermined amount of data to the convolutional neural network, calculating a loss function of the convolutional neural network taking an output of the second full-connected layer as an output of the convolutional neural network, and updating weight values in the convolutional neural network other than weight values of the first full-connected layer based on the calculated loss function.

* * * * *